July 29, 1969  R. W. ELLIOTT  3,457,781
MODIFIED DYNAMOMETER

Filed Aug. 29, 1966  2 Sheets-Sheet 1

INVENTOR
R. W. ELLIOTT
BY
Young + Quigg
ATTORNEYS

July 29, 1969   R. W. ELLIOTT   3,457,781
MODIFIED DYNAMOMETER

Filed Aug. 29, 1966   2 Sheets-Sheet 2

INVENTOR
R. W. ELLIOTT
BY
Young + Quigg
ATTORNEYS

{ # United States Patent Office 3,457,781
Patented July 29, 1969

---

3,457,781
MODIFIED DYNAMOMETER
Ralph W. Elliott, Bartlesville, Okla., assignor to Phillips Petroleum Company, a corporation of Delaware
Filed Aug. 29, 1966, Ser. No. 575,879
Int. Cl. E21b 47/00
U.S. Cl. 73—151                                   1 Claim

ABSTRACT OF THE DISCLOSURE

Apparatus for accurately determining the downhole performance of a pumping oil well is provided wherein measurements of the load and displacement per stroke of the polished rod are recorded electronically.

---

This invention relates to apparatus for determining the operating characteristics of a pump. In one aspect it relates to apparatus for measuring a load on a polished rod in a string of sucker rods, and for establishing a signal representative of said load. In another aspect it relates to methods of and apparatus for coordinating the load of a polished rod with the position of a pump.

The dynamometer is an instrument used to detect, analyze and solve problems in sucker rod pumping equipment. One type of dynamometer measures and records the deflection in a steel ring which is loaded across the diameter in compression by the stress in the rod string at the surface. The dynamometer is commonly inserted between the polished rod clamp and the carrier bar which supports the string of rods. The ring deflection is proportional to the load and is magnified mechanically and recorded on a drum by means of a stylus which makes a trace on wax paper. The amount of drum rotation is proportional to the length of the rod stroke. Thus, by the use of the dynamometer the stress on the polished rod as reflected by the deflection of the steel ring of the dynamometer is recorded graphically in the form of a stress diagram showing the actual stress in the rods during an up-and-down stroke of the beam.

The load data obtained by a dynamometer is useful in determining it there is excessive downhole friction, the amount of power being used at the polished rod, and the load on the downhole pump. Differential equations have been derived which describe the load at various places downhole. In order to utilize these equations, polished rod load data is required, including data which shows the change in load with respect to time. This data is used in an existing computer program to construct a curve of force versus displacement at a subsurface pump. The required rate data can be taken from dynamometer cards as obtained from the dynamometer. However, due to mechanical linkages used in making such cards, the data are not always accurate.

An object of my invention is to eliminate mechanical linkage in the preparation of a dynamometer card at a subsurface pump.

Another object of my invention is to obtain accurate values of oil well polished rod load and displacement versus time without interfering with the original function of a dynamometer.

Another object of the invention is to obtain accurate load and displacement versus time values at a subsurface pump to be used to construct an accurate force versus displacement (dynamometer card) representative of operating conditions at a subsurface pump by eliminating mechanical linkage used in making dynamometer cards but, at the same time, without interfering with the original use of the dynamometer.

Other aspects, objects and advantages of my invention will be apparent to one skilled in the art from a study of the written description, the drawing and the claims.

According to my invention, a dynamometer including a deflection ring also comprises a strain gage of a strain gage bridge attached to the deflection ring. As the polished rod moves up and down in the well, a load is placed on the deflection ring which is measured by the strain gage bridge. An electrical signal which is representative of the load on the deflection ring is produced by the strain gage bridge. Means are provided to record the signal versus time. The signal can be amplified if desired. A suitable means for recording the signal is a galvanometer pen and a strip chart recorder.

Further according to my invention means are provided to produce an electrical signal representative of the displacement of the polished rod. Suitable means include a potentiometer attached to the chart drum of the dynamometer. As the sucker rod string oscillates up and down in the well, the chart drum is rotated by a string attached to the well head at an end and to a pulley wheel at the oher end. As the chart drum rotates, it drives the potentiometer which produces an electrical signal representative of displacement of the polished rod for one stroke of the pump. The electrical signal from the potentiometer is transmitted to a second galvanometer pen which records displacement versus time of the sucker rod string on the same strip chart used to record the load on the deflection ring. The battery voltage, the variable resistance and the potentiometer resistance are sized to provide the current necessary for full scale pen deflection for any length rod stroke.

Thus, a simultaneous recording of an oil well beam pumping unit polish rod load (pounds) and displacement (inches) versus time (seconds) curve is produced from which as many as 100 points can be read and tabulated for one stroke of the pumping unit. The record made on the dynamometer drum can be used immediately for field use and the record obtained on the strip recorder by using the strain gage bridge and the potentiometer are analyzed on a computer to yield accurate information applying to the bottom-hole pump.

In the drawing, FIGURE 1 is an elevation of a polished rod dynamometer according to my invention.

Figure 1:
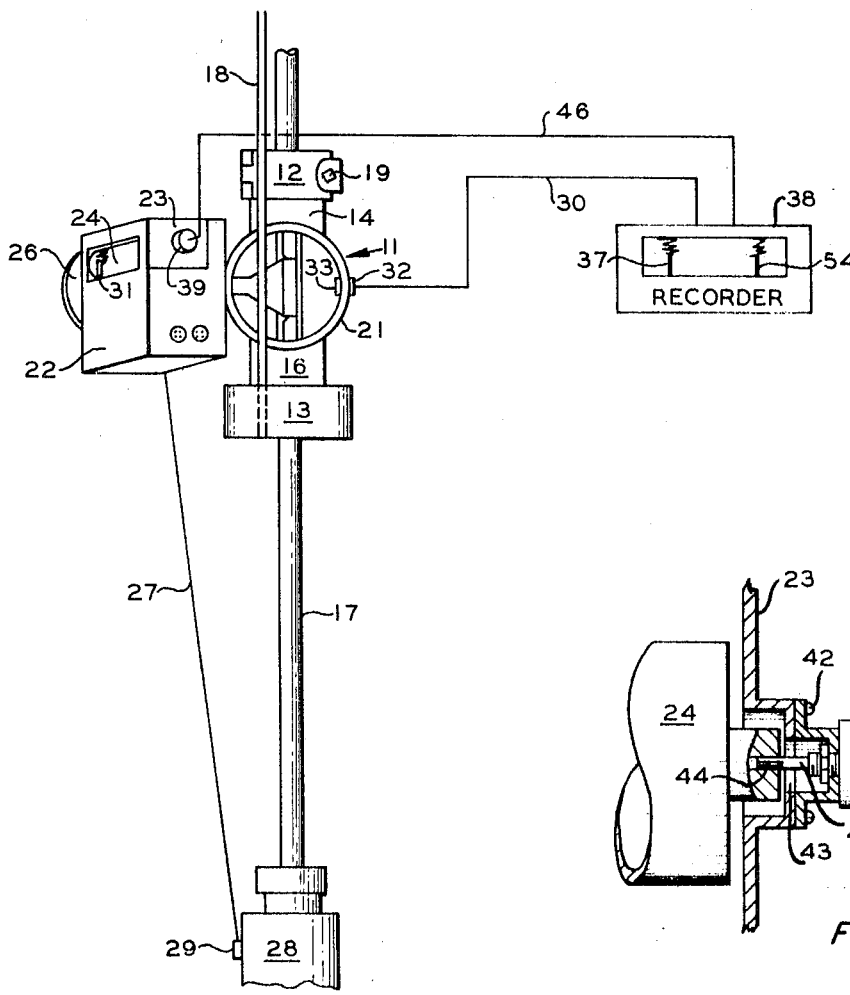

Referring to the drawing and specifically to FIGURE 1, a dynamometer 11 is inserted between polished rod clamp 12 and carrier bar 13 and positioned by shims 14 and 16. Carrier bar 13 supports polished rods 17 in the well and is attached to the horsehead of the walking beam (not shown) by bridle 18. Polished rod clamp 12 compresses shim 14 and dynamometer 11 against shim 16 and carrier bar 13. Polished rod clamp 12 is secured to polished rod 17 by bolt 19.
}

Dynamometer 11 comprises a deflection ring 21 and a cabinet 22 having a door 23 housing a spring-biased chart drum 24. A pulley wheel 26 connected to chart drum 24 is provided with a string 27 which is attached to pulley wheel 26 at one end and to wellhead 28 by bracket 29 at the other end. As polished rod 17 is moved up and down by a pumping unit (not shown) string 27 rotates chart drum 24. As the pumping unit makes a down stroke a spring unwinds on pulley wheel 26 in accordance with the position of the travel of polished rod 17. A stylus 31 is connected by a mechanical linkage, partially visible within deflection ring 21, and records the deflection of ring 21 on a chart mounted on drum 24, thus producing a plot of load versus movement of polished rod 17. The amount of drum rotation is proportional to the length of the polished rod stroke. Such a recording (dynamometer card) is useful in determining operating conditions of an oil well, such as the amount of power being used at the polished rod, the load on the downhole pump, etc. However, due to mechanical linkage in the dynamometer required rate date taken from dynamometer cards is not very accurate.

Four strain gages are affixed to deflection ring 21 of dynamometer 11 to measure the polished rod load on deflection ring 21 as polished rod 17 oscillates up and down. The strain gages are paired, strain gages 32 and 33 being graphically illustrated in FIGURE 1. As can be seen by reference to FIGURE 2, the outer surface of the deflection ring 21 is provided with two strain gages 32 and 34. The interior surface of deflection ring 21 is provided with the opposite member of each pair of the strain gages, thereby providing a total of four strain gages to measure the load on deflection ring 21. The four strain gages transmit electrical signals which are representative of the load on deflection ring 21. These signals are amplified and transmitted through electrical conduit 30 to galvanometer pen 37 which records the load on deflection ring 21 on a strip chart recorder 38.

Potentiometer 39 is attached to door 23 of cabinet 22. As chart drum 24 rotates in response to the movement of polished rod 17, it drives potentiometer 39 thereby producing an electrical signal representative of displacement of the polished rod for one stroke of the pump. The electrical signal is transmitted through electrical conduits 46 to strip chart recorder 38 where the electrical signal representative of displacement of polished rod 17 is recorded by galvanometer pen 54.

Figure 2:
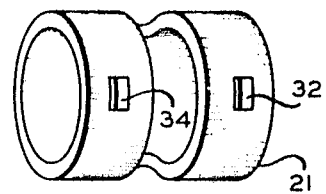
FIGURE 2 is an isometric view of a deflection ring of a dynamometer having strain gages attached thereto.

FIGURE 2 shows a deflection ring 21 of dynamometer 11 having strain gages 32 and 34 attached thereto.

Figure 3:
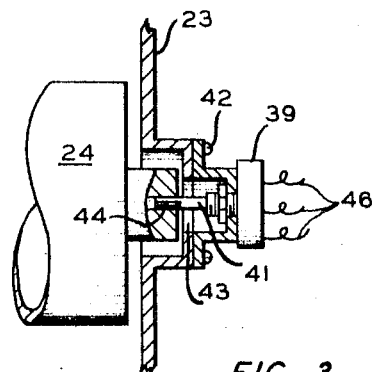
FIGURE 3 is a partially broken elevation of a potentiometer attached to a chart drum.

As illustrated in FIGURE 3, a potentiometer 39 having a shaft 41 is attached to door 23 of cabinet 22 of chart drum 24 by bolts 42. An opening 43 is provided in door 23 through which shaft 41 is inserted. Chart drum 24 is provided with a slot 44 (as shown) into which shaft 41 is inserted when door 23 is closed. As chart drum 24 rotates it turns a slider which moves on a coil of potentiometer 39, thus changing the resistance of potentiometer 39. The change in resistance varies the amount of current flowing through potentiometer 39. The variation of current is then transmitted through wire 46 to galvanometer pen 37 of strip chart recorder 38 where it is recorded.

Figure 4:
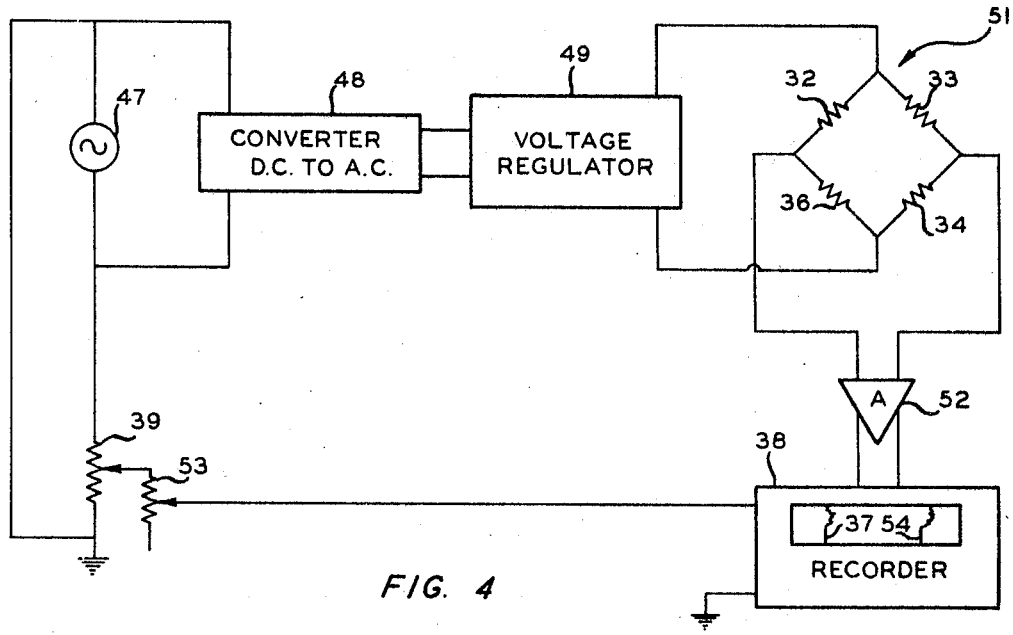
FIGURE 4 is a circuit diagram.

In the circuit of FIGURE 4 a power source 47 is connected to a D.C. to A.C. converter 48 which is, in turn, connected by electrical conduits to a voltage regulator 49. Voltage regulator 49 produces a constant A.C. voltage output to strain gage bridge 51. Strain gage bridge 51, a 120 ohm bridge, comprises four strain gages 32, 33, 34 and 36 connected in series with each other.

Strain gages 32 and 34 are positioned on the outside surface of deflection ring 21 and measure tension placed on deflection ring 21. Strain gages 33 and 36 are positioned on the inner surface of deflection ring 21 and measure compression on deflection ring 21. As load is placed on deflection ring 21 by polished rod 17, a variation in current flowing through strain gage bridge 51 is produced. The current flowing through strain gage bridge 51 is transmitted to amplifier 52 where the electrical signal is amplified and then transmitted through electrical conduits to strip chart recorder 38 where the variation in current flowing through strain gage bridge 51 is recorded by galvanometer pen 37 as load on deflection ring 21 of dynamometer 11 versus time.

Power supply 47 is also connected to potentiometer 39 which is connected to trimmer 53. Trimmer 53 is connected to strip chart recorder 38 where a second galvanometer pen 54 records an electrical signal received which is representative of displacement of the polished rod movement. Trimmer 53 is adjusted so as to produce full scale deflection on strip chart recorder 38.

Power supply 47 can be any suitable power supply such as a Sanborn Model 2E–12, 12-volt storage battery and converter 48 can be any suitable converter such as a Sanborn Model 53 Battery Converter. Any suitable 2-channel strip chart recorder such as a Sanborn Model 321 Two-Channel Carrier Recorder can be used as strip chart recorder 38.

Figure 5:
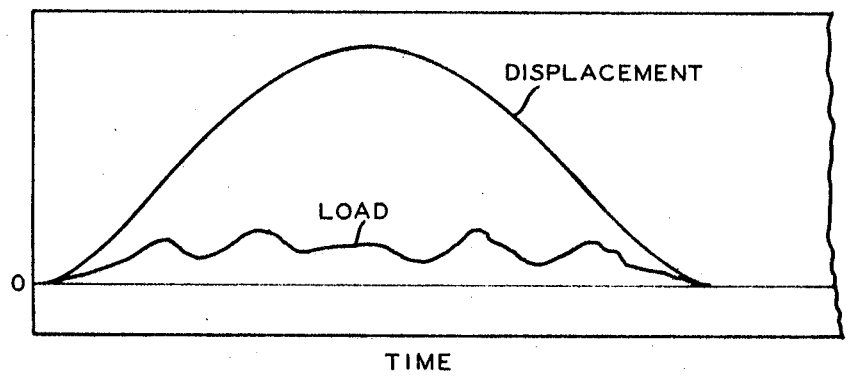
FIGURE 5 is a portion of a strip chart of an oil well beam pumping unit polish rod load (pounds) and displacement (inches) versus time (seconds).

FIGURE 5 illustrates a typical load and displacement versus time recording as produced employing a dynamometer having a strain gage bridge and potentiometer attached thereto.

In operation, a dynamometer having a deflection ring is inserted between the polished rod clamp and the carrier bar. As stress is placed on the polished rod at the surface the deflection ring is compressed. The ring deflection is proportional to the load on the polished rod and is magnified mechanically and recorded on a drum by a stylus which makes a trace on waxed paper. The amount of drum rotation is proportional to the length of the polished rod stroke.

As the above-mentioned trace, a dynamometer card, is produced a second trace is drawn in response to a first and second electrical signal. The first electrical signal is transmitted from strain gages attached to the deflection ring of the dynamometer representative of polished rod load on the deflection ring. The second electrical signal is transmitted from a potentiometer attached to the chart drum of the dynamometer and represents polished rod displacement versus time. This data, load and displacement versus time, is then used in an existing computer program to construct a curve of force versus displacement, a dynamometer card, at the subsurface pump.

The curves represting load and displacement versus time are drawn by two galvanometer pens on a strip chart in a recorder. A standard amplifier is used with the strain gage bridge and a battery is connected across the potentiometer. A variable resistance is connected in series with a potentiometer slider and a galvanometer coil. The other side of the potentiometer coil is connected to the mid-point of the battery. The battery voltage, the variable resistance and the potentiometer resistance are sized to provide the current necessary for full scale pen deflection for any length rod stroke.

Reasonable variation and modifications are possible within the scope of the invention which sets forth apparatus for electrically coordinating the load and displacement versus time of a polished rod without interfering with the use of a dynamometer.

I claim:

1. In an apparatus for producing a curve representative of force vs. displacement for an oil well pump comprising a dynamometer having a load ring adapted to be attached to the polished rod of the pump for measuring load on the polished rod, and having means for mechanically magnifying said load and recording said load on a drum recorder actuated by the movement of said polished rod, the improvement which comprises:

electrical strain gage means comprising four strain gages connected in series, two of said strain gages being connected on the inner surface of said load ring and two of said strain gages being connected on the outer surface of said load ring, thereby forming a four-element bridge to produce an electrical signal representing the deflection on said load ring responsive to the load on said polished rod;

a second electrical means which comprises a potentiometer attached to said drum recorder for producing a signal representative of the position of said polished rod;

an electrical power supply means which furnishes voltage to said electrical strain gage means and said second electrical means; and means to receive the electrical signals produced by the electrical strain gage means and the second electrical means which comprises a strip chart recorder having two galvanometer pins, one of the galvanometer pins being responsive to the electrical current provided by the power supply by way of said bridge, the second of the galvanometer pins being responsive to the current provided by said power supply by way of said potentiometer.

References Cited

UNITED STATES PATENTS

| | | | |
|---|---|---|---|
| 1,877,467 | 9/1932 | Lake. | |
| 2,472,047 | 5/1949 | Ruge | 73—141 |
| 2,063,169 | 12/1936 | Kemler | 73—141 |
| 2,440,706 | 5/1948 | Tint | 73—88.5 |
| 2,596,361 | 5/1952 | Blancher | 73—151 XR |
| 2,659,233 | 11/1953 | Fagg et al. | 73—141 |
| 3,343,409 | 9/1967 | Gibbs | 73—151 |

CHARLES A. RUEHL, Primary Examiner

U.S. Cl. X.R.

73—141